UNITED STATES PATENT OFFICE.

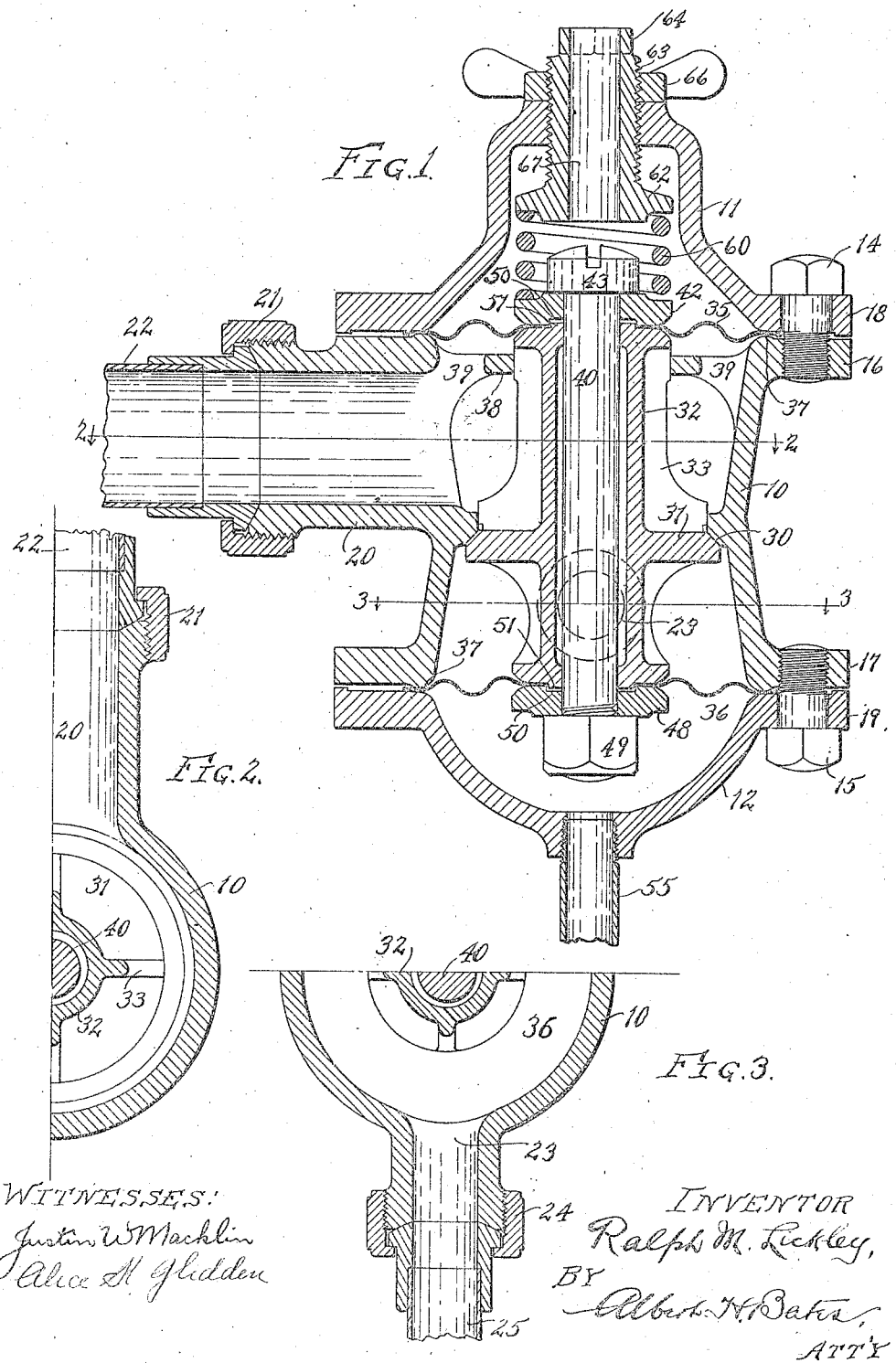

RALPH M. LICKLEY, OF EAST CLEVELAND, OHIO, ASSIGNOR TO JOHN G. TALMAGE, OF CLEVELAND, OHIO.

VALVE.

1,160,916.

Specification of Letters Patent. Patented Nov. 16, 1915.

Application filed February 9, 1915. Serial No. 7,182.

*To all whom it may concern:*

Be it known that I, RALPH M. LICKLEY, a citizen of the United States, residing at East Cleveland, in the county of Cuyahoga and State of Ohio, have invented a certain new and useful Improvement in Valves, of which the following is a full, clear, and exact description, reference being had to the accompanying drawings.

The object of this invention is to provide a simple, efficient and cheap automatic valve adapted to be controlled by fluid pressure, and control communication between two passageways. An application of mine, No. 7,183, filed February 9, 1915, shows and claims a locomotive drifting system, wherein live steam may be admitted directly to the cylinders when the locomotive is drifting, by means of a suitable automatic valve controlled by the diminution in pressure in the valve chest resulting at that time. The present invention is well adapted for use as the automatic valve of such drifting system. It provides a device which may be used for such purposes, and which is small and compact, cheap to construct, easy of access for repairs, in which there is no danger of leakage of steam, and in which the pressure of the live steam acts on two opposed, connected movable surfaces of substantially equal area, wherefore the pressure is balanced and does not interfere with the movement of the valve.

A preferred form of my invention is illustrated in the drawings hereof, and is hereinafter more fully described and the essential characteristics are summarized in the claims.

In the drawings, Figure 1 is a vertical central section of my automatic valve; Figs. 2 and 3 are horizontal sections on the correspondingly numbered lines on Fig. 1.

As shown, the body or casing of my valve, consists of an intermediate portion 10 and two end portions 11 and 12. These parts are secured together by cap screws or bolts 14 and 15 passing through outward flanges 16, 17, 18 and 19, on the respective members.

20 indicates a tubular extension from the member 10 which is connected by a suitable union 21 with an intake pipe 22.

23 indicates an exit port and passageway from the member 20, which is connected with a pipe 25.

The internal structure hereinafter described provides means for automatically opening or closing communication between the pipes 22 and 25. Accordingly, if the pipe 22 be connected with a supply of live steam, and the pipe 25 with a cylinder of a locomotive, this valve may control the admission of live steam to such cylinder. I will now describe the internal mechanism referred to.

In the interior of the casing or barrel 10 is an annular valve seat 30 adapted to be closed by a disk valve plug 31. This disk is shown as secured on a tubular stem 32. At its end this stem is secured to a pair of diaphragms 35 and 36, which extend across the casing and form flexible walls or heads therein. As shown, the diaphragm 35 is clamped between the flanges 16 and 18, by the screws 14, and the diaphragm 36 between the flanges 17 and 19 by the screws 15. Annular ribs 37 on the casing 10 bear against the corresponding diaphragm and insure a tight connection.

The tubular valve stem 32 is shown as connected with the diaphragms by means of a central bolt 40, which occupies the tubular stem and extends through the two diaphragms, and has suitable heads on their opposite sides. Thus, above the diaphragm 35 is shown a washer 42, above which is the head 43 of the bolt, while below the diaphragm 36 is shown a washer 48, below which is a nut 49 screwing onto the bolt. As shown, the washers 42 and 48 are provided with central recesses 50, and the ends of the tubular stem 32 with corresponding central bosses 51, which extend through openings in the diaphragm and into the recesses. This arrangement centralizes the valve stem and provides for a simple and tight connection to the two diaphragms.

The valve disk 31 and the sleeve 32 may be conveniently made of one integral casting. They may also have provided integral with them the wings 33, which stiffen the construction and form guides within the annular ring 38, connected by bridges 39 with the barrel wall 10.

The casing member 12 provides a chamber below the diaphragm 36. Communicating with this chamber is a suitable pipe 55, which is shown as tapped into the end of the casing. If this pipe be connected, for example, with the valve chest of a locomotive, the diaphragm 36 and hence the valve 31, is under the influence of the pressure conditions within the valve chest. Opposing such pressure is a spring acting on the opposite side of the diaphragm 35. This spring is shown as a helical compression spring 60 bearing at its inner end against the washer 42 and at its outer end against the adjustable abutment 62. This abutment is a tubular device, having a thread 63 and an angular head 64, whereby it may be screwed into a threaded opening in the end of the casing 11, and locked in desired position by a jam nut 66. When the spring 60 is properly adjusted it provides a force tending to open the valve 31 and admit live steam from the pipe 22 to the pipe 25. When equipped as a drifting valve, the pipe 55 is connected with the valve chest of the locomotive, and, in ordinary running, the steam pressure from the valve chest or dry pipe, acting through the pipe 55 on the diaphragm 36, overcomes the smaller pressure of the spring 60, and maintains the valve 31 seated. When, however, the throttle is closed, the pressure in the valve chest diminishes, and when it reaches a certain predetermined minimum, the spring 60 overcomes such pressure and forces the valve 31 downwardly, away from its seat and admitting live steam to the pipe 25.

By means of my valve and the pipe described, live steam is allowed to pass directly to the cylinders when the locomotive is drifting or standing, preventing the troublesome back-draft from the stack to the valve seat and into the cylinders, and the consequent abrasion and carbonization, and, on the other hand, performing the useful function of keeping the cylinder hot and of blowing the fire.

It will be noticed that the diaphragms 35 and 36 are of the same size, and, furthermore, they are sufficiently larger than the valve disk 31, so that their effective bending portion is substantially equal area with the valve disk. Accordingly, the valve is perfectly balanced. The live steam, entering through the passageway 22, acts in one direction on the disk 31, and in the opposite direction on the diaphragm 35, wherefore balance is maintained and no opposition is encountered in moving the valve. When the valve opens by reason of the diminution of the pressure in the lower chamber, the live steam then acts on the diaphragm 35 and the diaphragm 36, and is still balanced. The diaphragms may be made very tight by the construction shown, but any leakage of live steam past the diaphragm 36 simply passes idly into the pipe 55; while leakage past the diaphragm 37 escapes through the central bore 67 of the abutment 62.

Having thus described my invention, what I claim is:

1. The combination of a casing, a pair of diaphragms therein, a movable valve disk between the diaphragms, connected with them, and entrance and exit ports to and from the casing controlled by the valve disk, the two diaphragms being of equal size and their bending areas being each substantially equal to the effective area of the valve disk.

2. The combination of a casing, a pair of diaphragms therein, a movable valve plug between the diaphragms connected with them, entrance and exit ports to and from a space in the casing which is bounded by the two diaphragms when the valve plug is unseated, communication between the two ports being controlled by the valve plug which when seated forms a partition dividing said space, a conduit independent of the entrance and exit passages communicating with a chamber of which one of the diaphragms forms a wall and adapted to convey fluid pressure thereto, and a spring opposing inward movement of the last mentioned diaphragm and tending to unseat the valve plug.

3. The combination of a casing, a pair of diaphragms therein, a movable valve plug between the diaphragms connected with them, entrance and exit ports to and from a space in the casing which is bounded by the two diaphragms when the valve plug is unseated, communication between the two ports being controlled by the valve plug which when seated forms a partition dividing said space, a pipe secured to the casing and adapted to convey fluid pressure to the chamber within the casing beyond one of the diaphragms, and a spring within the casing opposite the other side of the other diaphragm and tending to unseat the valve.

4. The combination of a casing, a pair of diaphragms of equal size extending across the casing, a movable valve disk between the diaphragms and having an effective area substantially equal to the bending area of either diaphragm, means connecting the valve disk with both diaphragms, entrance and exit ports to and from the casing controlled by the valve disk, a conduit communicating with the chamber within the casing beyond one of the diaphragms, and a spring within the casing opposite the other side of the other diaphragm and tending to unseat the valve.

5. The combination of a casing, a pair of diaphragms therein forming the opposite ends of a chamber, a movable valve plug between the diaphragms engaged by them and adapted to divide said chamber, entrance and exit ports to and from the casing controlled by the valve plug, a conduit communicating with the chamber within the casing beyond one of the diaphragms, and adapted to conduct fluid pressure thereto, a spring within the casing opposite the other side of the other diaphragm and tending to unseat the valve, and means operable from outside of the casing for adjusting the spring.

6. The combination of a casing, a pair of diaphragms extending across it, a valve stem secured to said diaphragms, a valve carried by said stem between the diaphragms and adapted when seated to divide the chamber between the diaphragms, entrance and exit ports on opposite sides of the valve, a chamber with a pipe leading thereto beyond and partially bounded by one of the diaphragms, and a spring beyond the other diaphragm to unseat the valve in opposition to pressure in said chamber.

7. In a device of the character described, the combination of a casing, a pair of diaphragms extending across the same, a valve disk between the diaphragms and parallel therewith, a tubular stem formed integral with the disk and extending in both directions therefrom and abutting the diaphragms on their inner sides, and a bolt passing through the stem and provided with heads on the opposite sides of the two diaphragms.

8. In a device of the character described, the combination of a casing, two diaphragms of equal size extending across the same, a valve plug between the diaphragms adapted when seated to separate the space partially bounded by them into two chambers, the effective area of said plug being substantially equal to the effective area of either diaphragm, a stem for the plug connected with the two diaphragms, and entrance and exit ports communicating with the respective chambers and controlled by the valve plug, there being a chamber on the outer side of one of the diaphragms and a passageway for admitting fluid to said chamber.

9. The combination of a casing, a pair of equal-sized diaphragms extending across the casing, a seat carried by the casing between the diaphragms, a valve disk adapted to engage said seat, means connecting the disk with the two diaphragms, the area of said disk being substantially equal to the area of the bending portions of either diaphragm, means for admitting fluid under pressure between the disk and one of the diaphragms, and means for admitting fluid beyond the other side of the other diaphragm.

10. In a device of the character described, the combination of a casing having an internal annular seat, a pair of diaphragms extending across the casing on opposite sides of said seat, a disk valve adapted to rest on the seat and having a stem extending in both directions and connected with the two diaphragms and provided with wings, and means carried on the interior of the casing and forming a guide for said wings.

11. In a device of the character described, the combination of a casing having a valve seat, a pair of diaphragms extending across said casing, a valve disk extending transversely of the casing and adapted to rest on said seat and provided with a tubular stem making a closed connection with it and extending in two directions and abutting the inner side of the two diaphragms, a bolt extending through the tubular stem and the diaphragms and provided with heads on the outer sides of the two diaphragms, said tubular stem having guiding wings, and a ring supported by the interior of the casing and engaging said wings to guide the valve and stem.

12. The combination of a casing having an intermediate portion and two end portions, two diaphragms clamped between the intermediate portion and the end portions respectively, an internal annular valve seat, a valve disk for said seat, a tubular stem for the disk extending between and abutting the two diaphragms, the bolt passing through the tubular stem and through the diaphragms, washers on the outside of the diaphragm clamped by the bolt against the diaphragms, said stem and washers being provided one with a recess and the other with a coacting extension adapted to pass through a central opening in the diaphragm whereby the stem is properly centered.

In testimony whereof, I hereunto affix my signature in the presence of two witnesses.

RALPH M. LICKLEY.

Witnesses:
ALBERT H. BATES,
JUSTIN W. MACKLIN.

Copies of this patent may be obtained for five cents each, by addressing the "Commissioner of Patents, Washington, D. C."